United States Patent [19]

Hartmann

[11] Patent Number: 4,840,462

[45] Date of Patent: Jun. 20, 1989

[54] METHOD OF DRIVING A FERROELECTRIC LIQUID CRYSTAL DISPLAY DEVICE AND ASSOCIATED DISPLAY DEVICE TO ACHIEVE GRAY SCALE

[75] Inventor: Wilbert J. A. M. Hartmann, Eindhoven, Netherlands

[73] Assignee: U.S. Philips Corporation, New York, N.Y.

[21] Appl. No.: 160,424

[22] Filed: Feb. 25, 1988

[30] Foreign Application Priority Data

Mar. 17, 1987 [NL] Netherlands .......................... 8700627

[51] Int. Cl.⁴ ................................................ G02F 1/13
[52] U.S. Cl. ................................ 350/350 S; 350/333; 340/765; 340/784; 340/804
[58] Field of Search ............................ 350/333, 350 S; 340/765, 784, 804

[56] References Cited

U.S. PATENT DOCUMENTS 4,655,550  4/1987  Crossland et al. .......... 350/350 S X

FOREIGN PATENT DOCUMENTS

032362B1  7/1981  European Pat. Off. .
176763A1  4/1986  European Pat. Off. .
197742A2  10/1986  European Pat. Off. .

Primary Examiner—Stanley D. Miller
Assistant Examiner—Richard F. Gallivan
Attorney, Agent, or Firm—Paul R. Miller

[57] ABSTRACT

By using an auxiliary signal bringing a ferroelectric liquid crystal to an extreme transmission state in an active matrix it is impossible for successive charge compensation to occur on the pixels. This prevents the growth of regions where transmission occurs or does not occur and provides the possibility of obtaining gray scales in a reproducible manner.

9 Claims, 4 Drawing Sheets

METHOD OF DRIVING A FERROELECTRIC LIQUID CRYSTAL DISPLAY DEVICE AND ASSOCIATED DISPLAY DEVICE TO ACHIEVE GRAY SCALE

The invention relates to a method of driving a display device comprising a ferro-electric liquid crystal between two supporting plates and a system of pixels arranged in rows and columns, each pixel being constituted by picture electrodes provided on the facing surfaces of the supporting plates, and a system of row and column electrodes, at least one row of pixels being selected via a row electrode during a line selection period, data signals being presented via the column electrodes, and the row of pixels, prior to selection, being brought to an extreme state by means of a auxiliary signal.

BACKGROUND OF THE INVENTION

In this context an extreme state is to be understood to mean such a state that the pixel is substantially completely transmissive or non-transmissive. This state is determined by the nature of the ferro-electric display device which will be described in greater detail hereinafter. The choice of the amplitude of the auxiliary signal is also decisive of the rate at which the liquid crystal switches to this extreme state.

The method mentioned above are used, for example, in display devices for display screen or television uses. Notably for television uses and non-volatile memory display devices the use of ferro-electric liquid crystal materials seems to be attractive because much faster switching times can be realized therewith than with effects based on nematic liquid crystal materials.

Other advantages are that the viewing angle dependence is smaller (because generally a smaller thickness is used and because of the orientation of the molecules in faces parallel to the walls) and that the contrast is greater.

A method of the type mentioned in the opening paragraph is described in European Patent EP No. 0,197,742. In this method the presentation of data signals synchronously with a selection signal is preceded by so-called blanking pulses which must bring the liquid crystal to an initial state. In order to inhibit degradation of the ferroelectric material, the pulses used periodically reverse their sign.

The method described is used in a display device having a so-called passive matrix; and the signals (selection signals, data signals, blanking pulses) are directly presented to the row and column electrodes. The state of a pixel is determined by the line and data voltages. Since data voltages are presented to the column electrodes also when certain pixels are not selected, voltages, possibly in combination with cross-talk signals, may be produced so that the desired transmission state (in the example of European Patent EP No. 0,197,742 transmissive or nontransmissive) is not achieved or is lost.

The above-cited Patent Application proposes to solve this problem by providing the ferro-electrical effect with a certain threshold. Such thresholds cannot be realised or can hardly be realised in practice without contrast loss occurring in applications using larger numbers of lines. This Patent Application also refers only to switching between the states "0" and "1" and the possibility of introducing grey scales is not dealt with in the description of the devices shown.

SUMMARY OF THE INVENTION

It is an object of the invention to provide a method of the type described in the opening paragraph in which the above-mentioned problems can be obviated as much as possible and with which grey scales can be realised.

To this end a method according to the invention is characterized in that during at least a part of the line selection period the pixels are connected via active switching elements to the column electrodes in order to present data signals to the pixels and in that the auxiliary signal is presented to the pixels via the same switching elements at an instant before the commencement of the line selection over at least a period which is equal to the switching period of the ferro-electric medium and which has such a duration and amplitude that the extreme transmission state is reached, while after the line selection period the pixels assume a transmission state which is substantially exclusively determined by the data signal presented.

In this respect the words "substantially exclusively determined by the data signal presented" are understood to mean that the voltage presented during the selection across the pixel and the capacitance associated therewith is maintained and may possibly vary to a slight extent due to the leakage currents, but that no measures are taken to generate a given voltage across the pixels during the non-selection period of the kind described, for example, in Europen Patent EP No. 0,176,763.

The invention is based on the recognition that notably grey scales can be obtained by causing the pixels to assume a relaxation state under the influence of the charge which is provided during selection of the pixels or the capacitances associated therewith, while the polarisation due to this charge is compensated, as it were, by a polarisation of opposite sign in the liquid crystalline material. This is found to take place because the dipoles associated with the ferro-electric liquid crystal molecules are reversed under the influence of the charge and thus bring about the compensation. The division of dipoles which are reversed need not be homogeneous; however, and the fraction of reversed dipoles for one and the same voltage (with the selection period remaining the same) is invariably found to be substantially equal.

A method according to the invention for displaying grey scales is therefore characterized in that the grey scale is determined by the duration and the amplitude of the data signal presented during the period when the row of pixels is selected for data display. In the case of equal selection periods the data voltage thus determines the grey scale.

It will be evident that where a compensation effect is concerned, the provision of a given voltage across the pixels as described in European Patent EP No. 0,176,763 does not lead to a stable final state (grey value) and neither does the use of a passive drive in which voltages are directly presented to the pixel via the data electrodes beyond the actual selection period.

An additional advantage of the method according to the invention is that the ferro-electric liquid crystalline material does not need to have a threshold.

Preferably, the substantially non-transmissive (opaque) state is chosen as the extreme transmission state. This is favourable from the point of view of perception because only the maximum brightness is slightly affected, whereas contrast loss, which is more visible, occurs when selecting the transmissive state as the extreme transmission state.

The auxiliary signal can be realised in different manners, dependent on the switching elements used and the drive mode. In the case of a FET switch, bipolar transistor or other threepole switching elements the auxiliary signal will generally be presented to the column electrode during a part of the line selection period amply before the relevant row of pixels is written, while the actual data is presented to another row of pixels during the second part of the line selection period.

BRIEF DESCRIPTION OF THE DRAWINGS

The invention will now be described in greater detail with reference to the accompanying drawings in which.

The Figures are diagrammatic and not to scale. Corresponding components are generally denoted by the same reference numerals.

DESCRIPTION OF PREFERRED EMBODIMENTS

Figure 1:
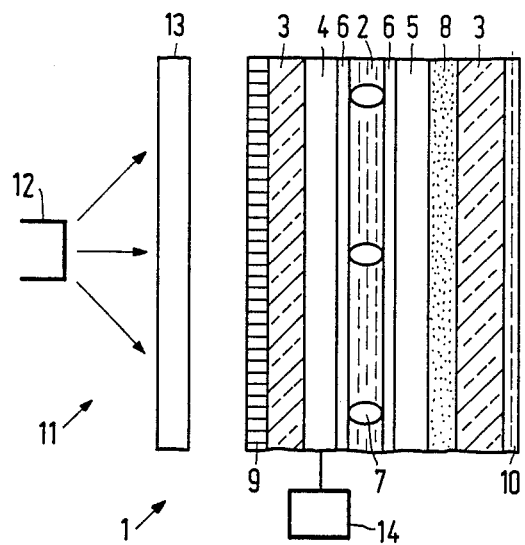
FIG. 1 shows diagrammatically the structure of a liquid crystal display device based on a ferro-electric liquid crystal.

FIG. 1 shows in a diagrammatic cross-section a display device 1 with a ferro-electric liquid crystal 2 as described, for example, in the Article by Clark and Lagerwall in "Appl. Phys. Lett." 36 (1980), 899 or in European Patent Application EP No. 0,032,362. The liquid crystal 2 is present between two flat transparent supporting plates 3 of, for example, glass or mica. A matrix of picture electrodes 4 is present on one of the supporting plates, and the picture electrodes 4 are driven, for example, via row electrodes and switching elements, while data signals are supplied via column electrodes. A counter electrode 5, which together with the picture electrodes 4 of the first matrix constitutes the pixels, is present on the other supporting plate. This counter electrode may be connected to a fixed or a variable voltage. Dependent on the drive mode used (for example, with MIMs or diode rings) the row electrodes may be provided on one supporting plate and the column electrodes may be provided on the other supporting plate. The thickness of the liquid crystal layer 2 is approximately 2 μm.

If desired, the electrode 4, 5 may be coated with orientation layers 6 or protective layers, while the device is furthermore provided with spacers 7 in order to obtain a uniform thickness of the liquid crystal layer. In the relevant example the display device also comprises a filter layer 8 with, for example separate colour filters for the colours red, green and blue, as well as a polariser 9 and analyser 10. Furthermore the device comprises a light source 11 consisting of a lamp 12 and a diffusor 13 while the matrix 4 and the associated elements are driven via drive electronics 14.

Figure 2A:
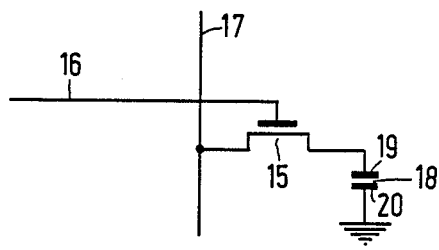
FIGS. 2a and 2b illustrate the realisation of grey scales with reference to a single pixel.

FIG. 2a shows diagrammatically how a single pixel of such a display device is driven by means of an active switching element, in this example a thin film field effect transistor 15. A selection line 16 is connected to the gate of the field effect transistor, while data signals are presented to the data line 17 which is connected to the liquid crystal display element, diagrammatically shown in this embodiment by a capacitance 18, the other connection of which is (virtually) connected to ground.

Figure 2B:
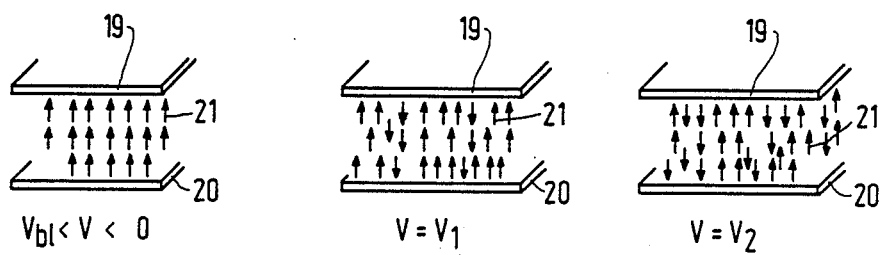
Figure 2B:
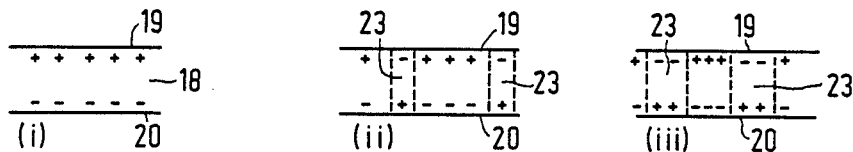

FIG. 2b shows diagrammatically the state of a pixel when a given voltage is applied across this element represented by the capacitance 18. In this embodiment this voltage is applied in the form of a pulse to the data line 17, while the element 18 is selected via the selection line 16.

In the method according to the invention an auxiliary signal ("blanking") $V_{b1}$ is first provided, which is negative in this example and bring the pixel to an extreme state with a transmission of substantially 0.

Due to this negative voltage pulse the first electrode 19 (which is connected to the transistor 15) becomes negative. By relaxation of the dipoles 21 associated with the molecules of the ferro-electric liquid crystal material these dipoles are directed in such a manner that the charge on the electrodes 19, 20 of the capacitance 18 is completely compensated or is compensated as much as possible. This results in all dipoles being identically directed (situation i in FIG. 2b) in the case of a sufficiently negative auxiliary voltage $V_{b1}$.

When driving at a voltage of the value $V_1$, which is slightly positive, the electrode 19 acquires a slightly positive charge so that some of the dipoles 21 are reversed. This continues until the positive charge has been compensated; and domains 23 at which the dipoles are reversed in a region between the two electrodes 19, 20 (situation ii in FIG. 2b) may be formed in the liquid crystal.

At a slightly larger voltage $V_2$ more and larger domains 23 will be produced (situation iii in FIG. 2b). In this reversal process the surface roughness of the wall may also play a role.

If, in the case of, for example, situation ii in FIG. 2b the voltage pulse of the value $V_1$ is repeated without any further measures, as is conventional practice notably in video applications, the electrode 19 will again acquire a slightly positive charge. Since it is compensated again by the reversal of some of the dipoles 21 the number of reversed dipoles 21 increases. As a result the domains 23 increase in number and size.

The presence of these domains, where the transmission is no longer 0, determines the grey value of the relevant pixel. Without special measures, notably in TV applications, this grey value is thus not constant, in the case of an equal data signal because the domains 23 increase when the voltage pulse is frequently presented. Also in the case of changing data signals the grey value of the pixels is dependent on their history.

However, in the method according to the invention a row of pixels, prior to the actual selection taking place, is brought to an extreme state (for example that of situation in in FIG. 2b) by means of the auxiliary signal $V_{b1}$ before the actual data signal is presented. This is effected timely enough to cause the dipoles in this row of pixels to relax to the associated initial state. Since a charge effect is concerned in this case, the value of the auxiliary signal $V_{b1}$ is also dependent on the period during which this auxiliary signal is presented. Since the domains 23 do not grow, now the transmission state, notably the grey scale of the pixels, is now exclusively determined by the data signal which has been presented.

Figure 3:
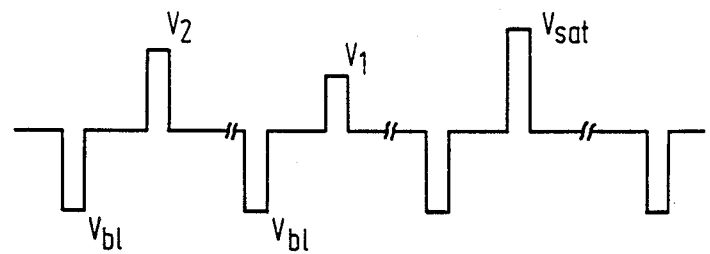
FIG. 3 and FIGS. 4a and 4b shows the response of the device of FIG. 1 driven by a method according to the invention.
Figure 3:
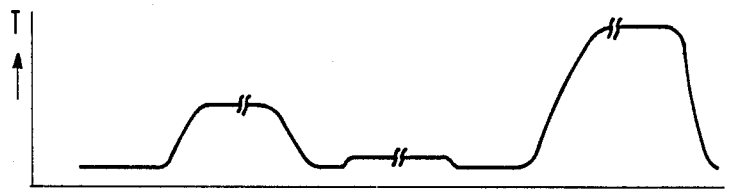

This is further shown with reference to FIG. 3 for a single pixel in which the signals $V_2$, $V_1$, $V_{sat}$ presented to the data lines during selection are each preceded by an auxiliary signal $V_{b1}$ so that the associated transmission levels are indeed exclusively determined by these signals.

Figure 4A:
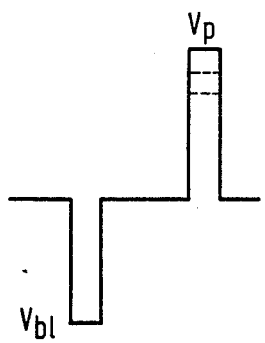
Figure 4B:
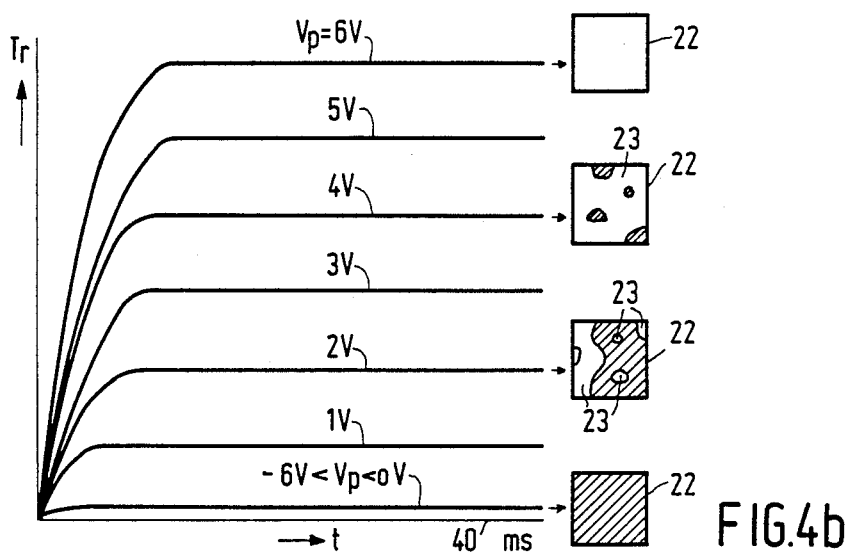

FIGS. 4a and 4b show how a given grey value is reached by using this method if a pixel is driven with a voltage pulse having a voltage value $V_p$ and a pulse width of the order of 16–64 μsec., while an auxiliary signal (blanking) having a voltage value of $V_{b1}$ and a pulsewidth of the same order is presented in advance.

The auxiliary signal is then located so far before the drive signal that the extreme transmission state can be reached. FIG. 4a diagrammatically shows the voltage variation with respect to time of the drive signals, while in FIG. 4b the squares 22 diagrammatically show the transmission of the associated pixels for some voltages. In the relevant example in which $V_{b1}$ is chosen to be −6V, there is no transmission for $-6V < V_p < 0V$, a small transmission for $V_p = 2V$, almost complete transmission for $V_p 4V$ and complete transmission for $V_p = 6V$. The squares 22 actually have a size of 10 μm × 10 μm so that the domains 23 are not separately visible but are observed as an intermediate transmission state (grey, value, colour level).

With the aid of active drive and using an auxiliary signal bringing the pixels to an extreme transmission state ("blanking") it is possible according to the invention to realise grey levels in large display devices based on the ferro-electric cells switch between black and the zero-order double refractive white. In this embodiment use is made of the ferro-electric material ZLI 3234 (Merck) with a thickness of 2 μm of the cell.

Figure 5:
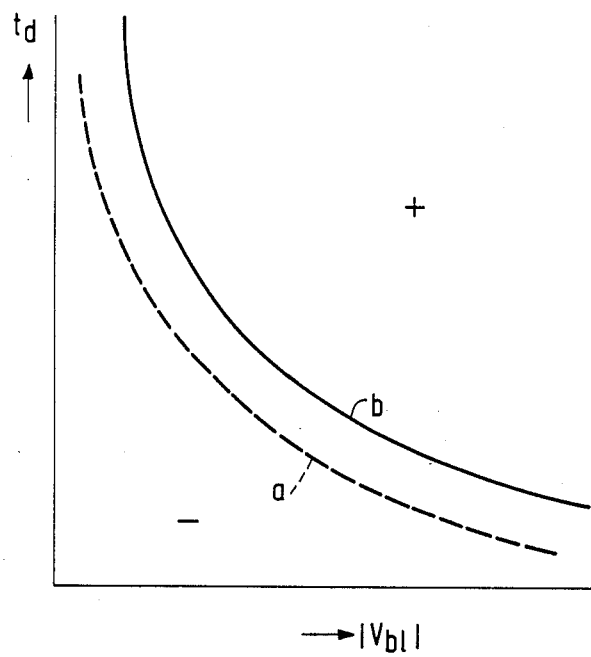
FIG. 5 shows diagrammatically the influence of the value of the auxiliary signal.

As already stated the auxiliary signal must be presented for a certain period $t_d$. This period $t_d$ is itself a function of the value of the auxiliary signal as is shown in FIG. 5. In the region indicated by "+" in FIG. 5 the device operates as described above; in the region indicated by "−" the grey values vary because not all dipoles are directed during the presentation of the auxiliary signal. FIG. 5 shows the relationship between $t_d$ and $|V_{b1}|$ for a fast switching ferro-electric liquid crystal material (line a) and for a slightly slower switching material (line b).

In the embodiments shown the pixel in the extreme state is substantially opaque. This is chosen because this is more pleasant from the observer's point of view, while the loss of light output is small. In conventionally used TV systems the line selection period is approximately 64/usec. and the number of lines is approximately 600. Most ferroelectric display display elements switch in less than 500 μsec so that at most eight lines are temporarily non-transmissive. The maximum loss of brightness is then smaller than 1.25% and this is even less for faster ferro-electric materials.

Figure 6:
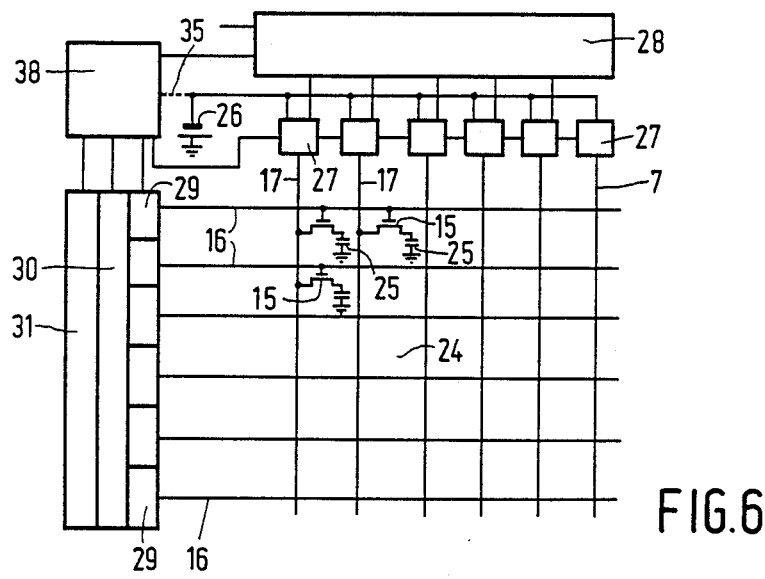
FIG. 6 shows diagrammatically a device for use of a method according to the invention.

FIG. 6 shows diagrammatically a device for use of a method according to the invention. This device comprises a matrix 24 of ferro-electric liquid crystal pixels 25 at the area of crossings of selection lines 16 which select thin film transistors 15 and data lines 17 to which auxiliary signals and data signals are presented. The auxiliary signal in this device is obtained, for example, via a voltage source 26 supplying a voltage $V_{b1}$. During a part of the line selection period, for example, half this period, the voltage $V_{b1}$ is presented via multiplexers 27 and during the other half data signals are presented from a shift register 28 to the data lines 17. Substantially simultaneously with the change of the voltage on the data lines the selection of the row of pixels changes because, via multiplexers 29, either a first line selection circuit 30 selects the line to which the auxiliary signal is presented or a second line selection circuit 31 selects the line of picture elements to be written. The line selection circuits are, for example, shift registers which select a subsequent line after each line selection period, while the selection of the line to be written is effected, for example, 6 line selection periods after the auxiliary signal has been presented to this line.

Figure 7:
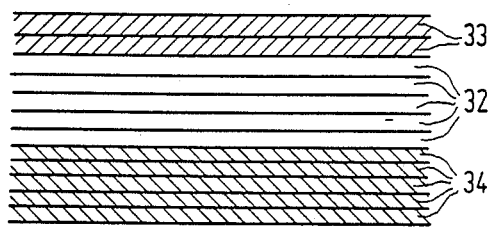
FIG. 7 shows diagrammatically the drive associated with the device of FIG. 6.

In the relevant embodiment in which the lines are written one after the other a band of 5 lines 32 without information then precedes, as it were, the lines 33 which have just been written, while the lines 34 still comprise information from the previous frame (FIG. 7). The device is driven by a drive circuit 38 which is shown diagrammatically; if necessary, this circuit 38 may also supply the auxiliary signal which is indicated by means of the broken line 35.

Figure 8:
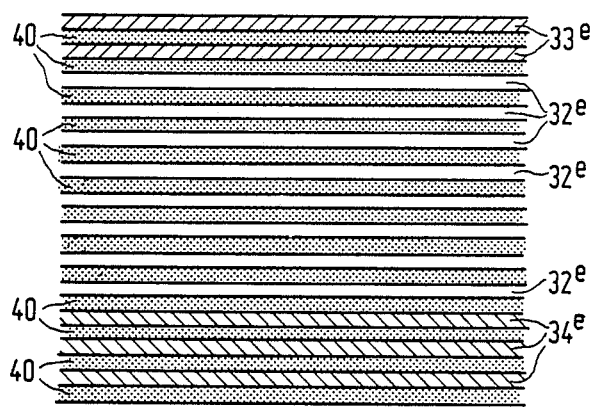
FIG. 8 shows a modification of FIG. 7.

In a similar device in which interlacing is used a band of eight lines 32e, for example, in the even field precedes the just-written lines 33e of the even field. The lines 34e comprise information from the previous even field, while the information of the lines 40 is determined by the previous odd field (FIG. 8).

The invention is of course not limited to the examples shown, but several variations are possible within the scope of the invention.

For example, as already stated, the row and column electrodes may be provided on different substrates. Different switching elements such as, for example, MIMs and diode rings may be used; if necessary, the counter electrode 5 may then also be in the form of a matrix of pixels. Instead of the transmission mode the device may alternatively be driven in the reflection mode.

What is claimed is:

1. A method of driving a display device for displaying grey scales, comprising a ferro-electric liquid crystal between two supporting plates and a system of pixels arranged in rows and columns, each pixel being constituted by picture electrodes provided on the facing surfaces of the supporting plates, and a system of row and column electrodes, at least one row of pixels being selected via a row electrode during a line selection period, data signals being presented via the column electrodes, and the row of pixels, prior to selection, being brought to an extreme state by means of an auxiliary signal, characterized in that during at least a part of the line selection period the pixels are connected via active switching elements to the column electrodes in order to present data signals to the pixels, in that the auxiliary signal is presented to the pixels via the same switching elements, the auxiliary signal being presented at an instant before the commencement of the line selection over at least a period which is equal to the switching period of the ferro-electric medium and which has such a duration and amplitude that the extreme transmission state is reached, in that after the line selection period the pixels assume a transmission state which is substantially exclusively determined by the data presented, and characterized in that the grey scale is determined by the duration and the amplitude of the data signal presented during the period when the row of pixels is selected for data display.

2. A method as claimed in claim 1, characterized in that the row of pixels is selected for data display during half a line selection period and the voltage level of the data signal determines the grey scale.

3. A method as claimed in claim 1, characterized in that pixels in the extreme transmission state are substantially opaque.

4. A method as claimed in claim 1, characterized in that during a part of the line selection period pixels are selected via a selection voltage on a first row electrode while simultaneously the data signals are presented to the column electrodes, and in that during the other part of the selection period pixels are selected via a second row electrode and simultaneously the auxiliary signal is presented to the column electrodes.

5. A display device comprising a ferro-electro-optical display medium between two supporting plates, a system of pixels arranged in rows and columns, in which each pixel is constituted by picture electrodes provided on the facing surfaces of the supporting plates, and a system of row electrodes and column electrodes for driving the pixels, characterized in that the column electrodes are connected to outputs of multiplex circuits for switching the column electrodes between data signals to be displayed an an auxiliary signal in order to bring the liquid crystal element to an extreme state, and in that the device comprises a drive and synchronisation circuit which, simultaneously with a selection voltage on a row of pixels to be displayed, causes data signals to appear on the column electrodes via the multiplex circuit and, which, simultaneously with a selection voltage on a different row of pixels provided with data signals at a later stage, causes the auxiliary signal to appear on the column electrodes, which auxiliary signal has a sufficient duration and amplitude to bring a pixel to an extreme state, and wherein the duration and amplitude of the data signal presented with the selection row of pixels determines the grey scale.

6. A display device as claimed in claim 5, characterized in that said different row of pixels is provided with data signals at least 1 line selection period later and at most 2 line selection periods later.

7. A display device as claimed in claim 5 or 6, characterized in that the multiplex circuits provide the column electrodes with data voltages during half a line selection period and with the auxiliary signal during the other half line selection period.

8. A method of driving a display device comprising a ferro-electric liquid crystal between two supporting plates and a system of pixels arranged in rows and columns, each pixel being constituted by picture electrodes provided on the facing surfaces of the supporting plates, and a system of row and column electrodes, at least one row of pixels being selected via a row electrode during a line selection period, data signals being presented via the column electrodes, and the row of pixels, prior to selection, being brought to an extreme state by means of an auxiliary signal, characterized in that during at least a part of the line selection period the pixels are connected via active switching elements to the column electrodes in order to present data signals to the pixels, in that the auxiliary signal is presented to the pixels via the same switching elements, the auxiliary signal being presented at an instant before the commencement of the line selection over at least a period which is equal to the switching period of the ferro-electric medium and which has such a duration and amplitude that the extreme transmission state is reached, in that after the line selection period the pixels assume a transmission state which is substantially exclusively determined by the data signal presented, and characterized in that pixels in the extreme transmission state are substantially opaque.

9. A method as claimed in claim 8, characterized in that during a part of the line selection period pixels are selected via a selection voltage on a first row electrode while simultaneously the data signals are presented to the column electrodes and in that during the other part of the selection period pixels are selected via a second row electrode and simultaneously the auxiliary signal is presented to the column electrodes.

* * * * *